United States Patent
Collins et al.

(10) Patent No.: US 9,948,592 B1
(45) Date of Patent: *Apr. 17, 2018

(54) MANAGING NOTIFICATIONS ACROSS SERVICES

(71) Applicant: Google Inc., Mountain View, CA (US)

(72) Inventors: Alexander Collins, San Francisco, CA (US); Brandon Bilinski, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/395,315

(22) Filed: Dec. 30, 2016

Related U.S. Application Data

(63) Continuation of application No. 13/797,431, filed on Mar. 12, 2013, now Pat. No. 9,560,001.

(60) Provisional application No. 61/619,320, filed on Apr. 2, 2012.

(51) Int. Cl.
 *G06F 15/16* (2006.01)
 *H04L 12/58* (2006.01)
(52) U.S. Cl.
 CPC .............. *H04L 51/24* (2013.01); *H04L 51/32* (2013.01); *H04L 51/34* (2013.01); *H04L 51/38* (2013.01)
(58) Field of Classification Search
 USPC ........................................................ 709/206
 See application file for complete search history.

(56) References Cited

U.S. PATENT DOCUMENTS

| | | |
|---|---|---|
| 5,835,084 A | 11/1998 | Bailey et al. |
| 5,958,006 A | 9/1999 | Eggleston et al. |
| 6,505,235 B1 | 1/2003 | Ogushi |
| 6,993,522 B2 | 1/2006 | Chen et al. |
| 6,999,469 B1 | 2/2006 | Chu et al. |
| 7,305,069 B1 | 12/2007 | Day |
| 7,509,382 B1 | 3/2009 | Jania et al. |
| 7,631,045 B2 | 12/2009 | Boerries et al. |
| 7,647,202 B2 | 1/2010 | Lamontagne |
| 7,664,814 B2 | 2/2010 | Little, II |
| 7,673,002 B1 | 3/2010 | Damarla |
| 7,814,160 B2 | 10/2010 | Burtner et al. |
| 7,865,557 B2 | 1/2011 | Tomkow |
| 8,090,878 B2 | 1/2012 | Pallipuram et al. |
| 8,161,107 B2 | 4/2012 | Gregg |
| 8,347,317 B1 | 1/2013 | Balaji et al. |
| 8,375,309 B2 | 2/2013 | Fioretti et al. |
| 8,375,400 B2 | 2/2013 | Sutedja et al. |
| 8,516,060 B2 | 8/2013 | Xie et al. |
| 8,539,361 B2 | 9/2013 | Hardy et al. |
| 8,706,824 B2 | 4/2014 | Davenport et al. |
| 8,761,737 B2 | 6/2014 | Clarke et al. |
| 8,825,842 B2 | 9/2014 | Papakipos et al. |
| 8,825,962 B1 | 9/2014 | Zhu et al. |
| 8,880,627 B2 | 11/2014 | Davenport et al. |

(Continued)

*Primary Examiner* — Alicia Baturay
(74) *Attorney, Agent, or Firm* — Lowenstein Sandler LLP

(57) ABSTRACT

Systems and methods for managing notifications are provided. One of the methods includes sending notification data to a first client service and a second client service for a message. The method further includes receiving an indication that the notification data has been interacted with using the first or second client service. The method includes updating a read status of the notification data when the indication is received, such that the notification data at the first and second client services has a same status indicator.

22 Claims, 8 Drawing Sheets

(56) References Cited

U.S. PATENT DOCUMENTS

| | | |
|---|---|---|
| 8,965,964 B1 | 2/2015 | Odell et al. |
| 8,984,068 B2 | 3/2015 | Bremner et al. |
| 9,148,397 B2 | 9/2015 | Talwar et al. |
| 9,158,559 B2 | 10/2015 | Simmons et al. |
| 9,203,796 B2 | 12/2015 | Hsiao et al. |
| 9,219,620 B2 | 12/2015 | Nixon et al. |
| 9,252,977 B2 | 2/2016 | Levi et al. |
| 2003/0023690 A1 | 1/2003 | Lohtia |
| 2004/0003042 A1 | 1/2004 | Horvitz et al. |
| 2004/0059791 A1 | 3/2004 | Sherman et al. |
| 2005/0021650 A1 | 1/2005 | Gusler et al. |
| 2006/0053379 A1 | 3/2006 | Henderson et al. |
| 2007/0185961 A1 | 8/2007 | Perlow et al. |
| 2008/0148148 A1 | 6/2008 | Ramanathan et al. |
| 2008/0242370 A1 | 10/2008 | Lando et al. |
| 2009/0049141 A1 | 2/2009 | Jones et al. |
| 2009/0150507 A1 | 6/2009 | Davis et al. |
| 2010/0017492 A1 | 1/2010 | Reistad |
| 2010/0049815 A1 | 2/2010 | Vanecek et al. |
| 2010/0223341 A1 | 9/2010 | Manolescu et al. |
| 2011/0119616 A1 | 5/2011 | Suzuki |
| 2011/0231499 A1 | 9/2011 | Stovicek et al. |
| 2011/0258264 A1 | 10/2011 | Bremner et al. |
| 2011/0271202 A1 | 11/2011 | Wong et al. |
| 2013/0007665 A1 | 1/2013 | Chaudhri et al. |
| 2013/0159440 A1 | 6/2013 | Appelman et al. |
| 2013/0325922 A1 | 12/2013 | Chaudhri et al. |
| 2014/0149538 A1 | 5/2014 | Deeter et al. |
| 2014/0201289 A1 | 7/2014 | Wheeler et al. |
| 2015/0019654 A1 | 1/2015 | Wheeler et al. |

MANAGING NOTIFICATIONS ACROSS SERVICES

CLAIM OF PRIORITY

The present application is a continuation of U.S. patent application Ser. No. 13/797,431 filed Mar. 12, 2013, which claims the benefit of U.S. Provisional Application No. 61/619,320, filed on Apr. 2, 2012, each of which are hereby incorporated by reference in their entirety for all purposes.

BACKGROUND

With an advancement of the Internet, a variety of networking applications are developed. For example, an electronic messaging application, a music application, a social network application, and a search application are developed. Generally, a user name and a password are used to access one or more of the networking applications. Some of the networking applications allow a user to chat with another user, to post a message on a website account of the other user, and to receive a message from the other user.

When a user sends a message to another user, a notification is provided to the other user that the message is received. However, sometimes, multiple notifications that the message is received are provided to the other user. Also, notifications are generated in various other instances, e.g., when a user sends a tagged photo to another user, uploads a photo to a website account of the user within a social network, posts to the website account, adds the other user to a circle within the website account of the social network, etc. In these instances, multiple notifications are received regarding each instance by the other user. The reception of multiple notifications for each instance may be frustrating to the other user.

SUMMARY

The present disclosure relates managing notifications across various client services.

Various implementations of the present disclosure provide systems and methods for managing notifications across various client services. It should be appreciated that the implementations of the present disclosure can be implemented in numerous ways, e.g., a process, an apparatus, a system, a device or a method on a computer-readable medium. Several implementations of the present disclosure are described below.

In some implementations, a method for managing notifications is provided. When a message is sent by one user to another user, multiple notifications are generated to notify the other user of the reception of the same message. For example, a notification is generated within a representation of an electronic messaging service, another notification is generated within a representation of a toolbar service, yet another notification is generated within a representation of a social network service, another notification is generated within a representation of an operating system service, a notification is generated within a representation of a widget service, and a notification is generated within a representation of a mobile application. When the other user reads one of the notifications, the remaining notifications are automatically modified, e.g., deleted or shaded or unbolded. There is no need for the other user to read all the notifications to access the same message.

In some implementations, a method for managing notifications is described. The method includes sending notification data to a first client service and a second client service for a message. The method further includes receiving an indication that the notification data has been interacted with using the first or second client service. The method includes updating a read status of the notification data when the indication is received, such that the notification data at the first and second client services has a same status indicator.

These and other implementations can include one or more of the following features.

In various implementations, the operation of updating of the read status includes marking the read status as read without requiring a message that indicates that the notification data is read via the second client service.

In some implementations, the method includes receiving a network message that is generated using a website account interface. The website account interface is associated with a first website account. The network message is designated for a second website account and the first and second website accounts are associated with the first client service. The method includes generating the notification data based on the network message.

In some implementations, the method includes associating the notification data with a first identifier and the read status. The read status indicates whether the notification data is read via the first and second client services. The operation of associating the notification data with the first identifier and the read status includes assigning a first identification number to the notification data and assigning the read status to the notification data. The method includes associating the notification data with a second identifier. The operation of associating the notification data with the second identifier includes assigning a second identification number to the notification data.

In various implementations, the method includes initiating the read status to indicate that the notification data is unread via the first client service. The operation of initiating the read status to indicate that the notification data is unread via the first client service includes assigning a value to the read status to indicate that the notification data is unread via the first client service. The method includes initiating the read status to indicate that the notification data is unread via the second client service. The operation of initiating the read status to indicate that the notification data is unread via the second client service includes assigning the value to the read status to indicate that the notification data is unread via the second client service.

In some implementations, the operation of receiving the indication that the notification data has been interacted with includes receiving a read notification message indicating that the notification data is read by a user via the first client service.

In some implementations, the operation of receiving the indication that the notification data has been interacted with includes receiving a message including the indication via a network from a client device.

In several implementations, the operation of sending the notification data to the first client service includes sending the notification data to the first client service via a network. The operation of sending the notification data to the second client service includes sending the notification data to the second client service via the network. Moreover, the operation of updating the read status includes updating a first value of the read status to a second value.

In some implementations, the method includes sending a modify instruction message to the second client service in response to updating the read status. The operation of sending the modify instruction message to the second client service includes sending the modify instruction message via a network to a client device.

In various implementations, the first client service includes a social network service, an electronic messaging service, or a telecommunications service and the second client service includes the social network service, the electronic messaging service, or the telecommunications service.

In some implementations, the method includes communicating an instruction to modify the notification data via the second client service. The operation of communicating the instruction to modify the notification data includes sending the instruction to indicate via the second client service that the notification data is read by a user.

In several implementations, the first client service is same as or different from the second client service.

In various implementations, a method for managing notifications is described. The method includes determining whether a first notification is displayed via a first client service, sending notification data associated with the first notification to a server, and receiving an instruction to display a second notification via a second client service, the second notification based on the notification data. The first and second notifications notify a user of receipt of a network message. The network message is contextually originated using the first client service. The method further includes determining whether the first notification is read via the first client service and modifying the first and second notifications in response to determining that the first notification is read. The modification indicates that the first notification is read.

In some implementations, the first and second notifications are displayed within a website account interface that is associated with a website account. The operation of modifying the second notification includes modifying the second notification via the second client service without receiving an input indicating that the second notification is read via the second client service.

In various implementations, the method includes sending the notification data with an identifier of the notification data to the server.

In some implementations, the operation of determining whether the first notification is read includes determining whether a selection of the first notification is received from a user via an input device.

In some implementations, the operation of modifying the second notification is performed in response to receiving an instruction from the server to perform the modification.

In several implementations, the operation of modifying the second notification is performed in response to receiving an answer from the server to a poll. The answer indicates that the server modified a read status that is associated with the second notification and with a client application. The client application is associated with the second client service.

In some implementations, the operation of modifying the second notification includes deleting the second notification.

In several implementations, the first client service is same as or different from the second client service.

In some implementations, a system for managing notifications is described. The system includes a network adapter that is used for sending first notification data to a first client service and second notification data to a second client service. The network adapter is used for receiving an indication that the first notification data has been interacted with using the first client service. Also, the system includes a processor that is used for updating a first read status and a second read status to represent that the first notification data and second notification data have been interacted with based on the indication.

In some implementations, the processor associates the first notification data with a first identifier and the first read status. Moreover, the processor associates the second notification data with a second identifier and the second read status. The first read status indicates whether the first notification data is read via the first client service. The second read status indicates whether the second notification data is read via the second client service. The processor initiates the first read status and the second read status to indicate that the first and second notification data are unread. When the first notification data is read via the first client service, the processor marks the second read status as read without requiring a message that indicates that the second notification data is read via the second client service.

In several implementations, the first client service is same as or different from the second client service.

In some implementations, a method for managing notifications is described. The method includes determining an occurrence on a first service of an online interaction with content associated with the first service and generating first notification data for the first service and second notification data for a second service. The operation of generating the first notification data is performed based on the occurrence of the online interaction. The second service provides content that is different than that associated with the first service. The method further includes receiving an indication of an interaction with the first notification data and updating the second notification data based on the interaction with the first notification data. In various implementations, the content of the first service is particular to the first service.

In several implementations, the first service is different than the second service.

These and other implementations can be embodied in corresponding systems, methods, and apparatus, including computer program products.

These and other implementations may provide one or more of the following advantages. For example, a user does not need to delete notifications received in different client services on one or more client devices. When a user sends a message to another user, multiple notifications are generated on various client services that are accessed by the other user. The client services are accessed by the other user via a website account. The other user views one of the notifications in a client service. When the other user views the notification, the notification is indicated as read by the client service. However, the other client services do not change a status of remaining notifications received within the other services. Various implementations described in the present disclosure modify the status when the other user reads the notification in one of the client services.

Other aspects will become apparent from the following detailed description, taken in conjunction with the accompanying drawings.

BRIEF DESCRIPTION OF THE DRAWINGS

Various implementations of the present disclosure may best be understood by reference to the following description taken in conjunction with the accompanying drawings.

DETAILED DESCRIPTION

The following implementations describe systems and methods for managing notifications. It will be apparent, that the present implementations may be practiced without some or all of these specific details.

Figure 1:
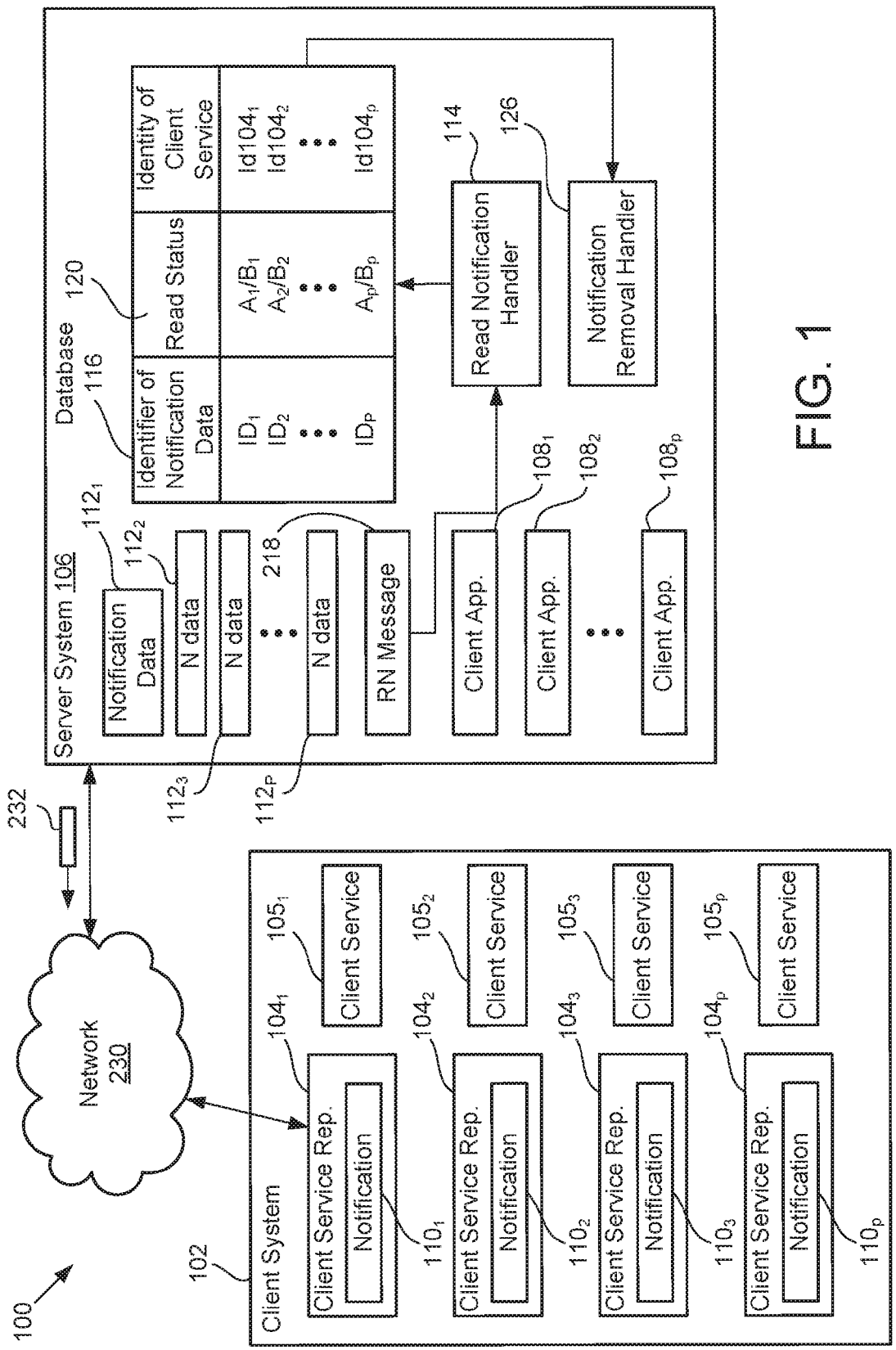
FIG. 1 is a diagram of an example architecture for illustrating management of notifications, in accordance with several implementations of the present disclosure.

FIG. 1 is a diagram of some implementations of an architecture 100 for illustrating management of notifications. A client system 102 is used to provide various client services 105, which include a client service $105_1$, a client service $105_2$, a client service $105_3$ and so on until a client service $105_P$, where P is an integer greater than zero.

The client system 102 includes one or more client devices, e.g., desktop computer, laptop computers, tablets, and cell phones. Client service representations 104 are displayed on a display device of a client device of the client system 102. In some implementations, a client service representation is displayed within a website that includes one or more web pages. A client service is executed by a graphical processing unit (GPU) of the client system 102 to render a corresponding client service representation. For example, the client service $105_P$ is executed by a GPU of a client device to display the client service representation $104_P$. Examples of a display device includes a light emitting diode (LED) display device, a liquid crystal display (LCD) device, a cathode ray tube (CRT) display device, and a plasma display device.

Examples of a client service include an application service and an operating system service. Examples of an application service include a mobile application service, a music service, a search service, a social network service, an electronic messaging service, a widget service, a toolbar service, a calendar service, a document storage service, a document creation service, a photo storage service, a news service, a maps service, a translation service, and a telecommunications service. A corresponding client application is executed by one or more servers of a server system 106 to provide a client service. For example, a client application $108_1$ is executed to provide the client service $105_1$ and another client application $108_2$ is executed to provide the client service $105_2$. As another example, a client application includes instructions that provide functionality and a client service includes instructions that provide representation of the functionality. To further illustrate, a client service includes instructions that command artwork, e.g., look and feel, of a client service representation and a client application includes functionality, e.g., what information to display when a link is selected by a user via an input device. A server, as used herein, includes a physical machine or a virtual machine.

It should be noted that a client application is executed by the processor 254 to generate and send a corresponding client service that is processed by a GPU to provide the corresponding client service representation. For example, the client application $108_P$ is executed by a processor of the server system 106 to generate and send the client service $105_P$ that is processed by a GPU of the client system 102 to display the client service representation $104_P$.

The server system 106 includes one or more servers, each of which includes one or more processors and one or more memory devices. A processor, as used herein, includes an application specific integrated circuit (ASIC), a programmable logic device (PLD), a central processing unit (CPU), or a microprocessor.

As used herein, a memory device includes a read-only memory (ROM), a random access memory (RAM), or a combination thereof. As another example, a memory device includes a hard disk and a flash memory.

In some implementations, one or more of client service representations 104 extends across one or more of the remaining of the client service representations 104. For example, a toolbar, which is a toolbar service representation, extends across an electronic messaging service representation, a social network service representation, a photo storage service representation, a document storage service representation, and a document creation service representation. As another example, a toolbar is displayed on a display screen when an electronic messaging service, a document creation service, a document storage service, and/or a search service are accessed by a user. Examples of a display screen include an LED display screen, an LCD screen, a CRT display screen, and a plasma display screen. A user, as used herein, is an entity or a person.

In various implementations, one or more client services 105 are accessed by a user via an input device. Examples of an input device include a keyboard, a mouse, a stylus, and a touch screen. For example, login information, e.g., a user name and/or a password, is received by a server from a user via an input device. In this example, the server authenticates the login information and upon authentication, provides access to one or more of client services 105.

In some implementations, all client services 105 are accessed by a user when his/her login information is authenticated. In other implementations, one or more but not all of the client services 105 are accessed by a user when his/her login information is authenticated. In yet other implementations, a first set of login information is authenticated to provide access to one or more but not all of the client services 105 and a second set of login information is authenticated to provide access to the remaining of the client services 105. For example, a first user name and a first password of a user are authenticated to provide access to client services $105_1$ and $105_2$ and a second user name and a second password of the user are authenticated to provide access to client services $105_3$ thru $105_P$.

In some implementations, a mobile application service is provided by a server to perform a variety of tasks on a cell phone. For example, a mobile application service includes a music service, a search service, a social network service, an electronic messaging service, a widget service, a toolbar service, a calendar service, a document storage service, a document creation service, a photo storage service, a news service, a maps service, a translation service, a telecommunications service, or a combination thereof that is provided on a cell phone.

In some implementations, a music service is provided by a server to allow a user to upload music to the server via a website and/or to download music from the server via the website. Moreover, in some implementations, a server that provides a search service receives a search query from a user via a web browser, searches one or more databases, and provides results of the search via the web browser to the user.

Also, in several implementations, a social network service provides social services that allow users to stay in touch with each other. For example a social network service provides a website for a user to post multimedia, e.g., an image, text, video, or audio, receive multimedia from another user, search for other users, chat with users, and/or categorize users. Moreover, in some implementations, an electronic messaging service allows a user to send and/or receive electronic mails from other users via a website. In several implementations, multimedia is embedded within an electronic message.

Furthermore, in several implementations, a widget service allows a user to access information, e.g., a time of day, a calendar, weather, stock quote, etc., from a computer desktop. For example, when a user downloads a widget service via a website, the information that is accessed via the widget service is displayed on a display screen. The information accessed via a widget is accessed from one or more servers via a network. Also, in some implementations, a toolbar service provides a display of input/output (I/O) elements, e.g., buttons, icons, and menus on a display screen.

Additionally, in some implementations, a document creation service allows a user to create via a website a formatted document, e.g., a spreadsheet and a word processing document. Also, in some implementations, a document storage service allows a user to store a document on a server.

Moreover, in several implementations, a photo storage service allows a user to store, access, view and/or share images via a website on a server. An image is shared with other users. For example, when a share icon within a photo storage service is selected by a user via an input device, another user can view on a website one or more photos that are shared. Furthermore, in some implementations, a news service provides access to news, e.g., world news, finance news, entertainment news, weather news, local community news, etc., via a website.

Also, in some implementations, a maps service provides access to a user to directions from a start address to a destination address, a satellite view of a geographical area, and/or to places of interest to a user. Moreover, in some implementations, a translation service provides access to a user to translation of a web page from one language to another language.

It should be noted that the client services 105 are not limited to the ones described herein. For example, various other services 105 include legal search service, a shopping service, and financial services.

Notifications 110 are displayed in client service representations 104. For example, a notification $110_1$ is displayed in the client service representation $104_1$, a notification $110_2$ is displayed in the client service representation $104_2$, a notification $110_3$ is displayed in the client service representation $104_3$, and so on until a notification $110_P$ is displayed in the client service representation $104_P$.

A notification is a part of a client service representation. For example, when the client service $105_P$ is executed by a GPU to render the client service representation $104_P$, the notification $110_P$ is also rendered within the client service representation $104_P$.

It should be noted that the notifications 110 notify a first user that a second user sent from his/her website account interface a network message to the first user's website account. When a network message is sent from one website account interface to another website account interface, the network message is posted on the other website account interface. Examples of each of the notifications 110 include an integer that indicates a number of notifications, a text notice that indicates that a network message is posted in a website account interface, a combination thereof, etc. For example, when a user sends a network message, e.g., "Nice pictures", "How are you?", "I went to San Francisco this weekend", etc., from his/her website account interface to another user's website account interface, a notification is displayed in one of the client service representations 104 that is accessed via the other user's website account interface. In this example, the notification indicates that one network message is received within the other user's website account interface. Examples of a text notice include "You have one message", "Peter wrote on your wall", and "You have a message". In some implementations, the notification $110_1$ is an integer and the notification $110_2$ is a text notice.

In several implementations, the notifications 110 are associated with a single network message. For example, when any of the notifications 110 are selected by a user via an input device, the same network message is displayed to the user. As another example, when a network message is sent from one website account interface to another website account interface, the notifications 110 are displayed in the client service representations 104. As yet another example, a first notification, e.g., notification $110_1$, includes multiple sub-notifications that lead to a network message and a second notification, e.g., notification $110_2$, also leads to the network message. In this example, the first notification includes a first sub-notification, e.g., an integer, that is displayed on a display screen. In this example, when the first sub-notification is selected by a user via an input device, a second sub-notification, e.g., text notice, is displayed to the user. The second sub-notification is a part of the notification. When the second sub-notification is selected by the user via the input device, the network message is displayed. Moreover, when the second notification is selected by a user via an input device, the network message is displayed.

A website account is associated with one or more of client services 105 via the login information. For example, when a user name and password are authenticated, access to a website account is provided to a user. In the example, one or more of client services 105 are provided to the user via the website account. Also, in this example, a website account interface that includes the client service representations 104 is displayed to the user. Moreover, in this example, the website account interface is an interface common to one or more client services 105 that are accessed when the login information is authenticated. Furthermore, a website account is accessed via a website of a web browser.

Notification data 112 is sent by the server system 106 via a network 230 to the client system 102, which processes the notification data 112 on one or more display screens to display the notifications 110. For example, the notification data $112_1$ is sent by the server system 106 via the network 230 and is processed by the client system 102 to display the notification $110_1$ within the client service representation $104_1$. As another example, the notification data $112_P$ is sent by the server system 106 via the network 230 and is processed by the client system 102 to display the notification $110_P$ within the client service representation $104_P$. In several implementations, notification data is embedded within a notification. For example, when the notification data $112_P$ is sent by the server system 106 via the network 230 and is processed, e.g., rendered, etc., by the client system 102 to display the notification $110_P$ within the client service representation $104_P$, the notification data $112_P$ becomes a part of the notification $110_P$. As another example, when a user reads the notification $110_P$ that may have a format, e.g., italics, bold, colored, grayed, font, letter size, etc., the user reads information, e.g., substance, conveyed message, sequence of symbols, etc., within the notification data $112_P$.

Examples of the network 230 includes a wired network, a wireless network, or a combination thereof. For example, the network 230 includes a wired local area network (LAN), a wired wide area network (WAN), a wireless LAN, a wireless WAN, or a combination thereof. As another example, the network 230 includes an Intranet, the Internet, or a combination thereof.

The server system 106 creates and maintains a database 116 of identifiers $ID_1$ thru $ID_P$ of notification data 112 and read status 120. Each identifier ID is associated with different notification data 112. For example, the notification data $112_1$ is identified with the identifier $ID_1$, the notification data $112_2$ is identified with the identifier $ID_2$, and so on until the notification data $112_P$ is identified with the identifier $ID_P$.

Furthermore, each identifier $ID_1$ thru $ID_P$ is associated with an identity $Id_{104_1}$ thru $Id_{104_P}$ of a client service. For example, the identifier $ID_1$ is associated with an identity $Id_{104_1}$ of the client service $105_1$ and the identifier $ID_P$ is associated with an identity $Id_{104_P}$ of the client service $105_P$.

Moreover, each read status is associated with an identifier of notification data. For example, a value $A_1/B_1$ is a value of the read status 120 of the notification data $112_1$ that is processed to display notification $110_1$ within the client service representation $104_1$. As another example, a value $A_P/B_P$ is a value of the read status 120 of the notification data $112_P$ that is processed to display notification $110_P$ within the client service representation $104_P$.

An example of the value A, e.g., one or more of the values $A_1$ thru $A_P$, includes a zero or a one. A is set to indicate a value X and B e.g., one or more of the values $B_1$ thru $B_P$, is set to indicate a value Y, where X and Y describe status of whether a message is read or unread, and where X has a different value than Y. For example, if A is zero, B is one and if A is one, B is zero. When a value of A is assigned to a read status of a notification that is displayed within a client service representation, the notification is unread by a user via a client service that is executed to render the client service representation. For example, when the notification $110_2$ that is displayed within the client service representation $104_2$ has a read status of $A_2$, a user has not selected the notification $110_2$ to read the notification $110_2$. Moreover, when a value of B is assigned to a read status of a notification that is displayed within a client service representation, the notification is read by a user via a client service that is processed to render the client service representation. For example, when the notification $110_1$ that is displayed within the client service representation $104_1$ has a read status of $B_1$, a user has selected the notification $110_1$ to read the notification $110_1$.

The value $A_1$ changes to $B_1$ within the database 116 when a processor of the server system 106 determines that the notification $110_1$ is read via the client service $105_1$. The notification $110_1$ is read via the client service $105_1$ when a user selects the notification $110_1$ displayed within the client service representation $104_1$. Moreover, the value $A_P$ changes to $B_P$ when a processor of the server system 106 determines that the notification $110_P$ is read via the client service $105_P$. The notification $110_P$ is read via the client service $105_P$ when a user selects the notification $110_P$ displayed within the client service representation $104_P$.

In some implementations, the server system 106 initiates the read status 120 to indicate that all notifications are unread. For example, the server system 106 initiates the read status 120 to values $A_1$ thru $A_P$.

When a user reads one of the notifications 104 via a corresponding one of client service representations 104 in which the notification is displayed, a "read notification" (RN) message 218 is sent from the client system 102 via the network 230 to the server system 106. For example, a user selects via an input device the notification $110_1$ within the client service representation $104_1$ to read the notification via the client service $105_1$ that is processed to render the representation $104_1$. In some implementations, the RN message 218 includes an identifier of one of client services 105 via which one of notifications 110 is read and an identifier of the notification. For example, the RN message 218 indicates that the notification $110_1$ is read by a user via the client service $105_1$.

Upon determining that the selection is made, the client system 102 sends the RN message 218 to an RN handler 114 via the network 230. When the RN handler 114 receives the RN message 218, the RN handler 114 updates a value, of read status 120, that is identified by the identifier $ID_1$. For example, in response to receiving the RN message 218, the RN handler 114 determines that the identifier $ID_1$ within the RN message 218 identifies the notification data $112_1$. Upon determining so, the RN handler 114 determines that the read status $A_1$ within the database 116 corresponds to the identifier $ID_1$. The RN handler 114 updates the value from $A_1$ to $B_1$.

Moreover, upon updating the value from $A_1$ to $B_1$, the RN handler 114 also updates values of read status 120 of the remaining notification data $112_2$ thru $112_P$ that are associated with the notification data $112_1$ that is identified in the RN message 218. For example, in response to updating the value from $A_1$ to $B_1$, the RN handler 114 updates the values $A_2$ thru $A_P$ to $B_2$ thru $B_P$ in the database 116. In some implementations, the RN handler 114 updates the values $A_2$ thru $A_P$ to $B_2$ thru $B_P$ simultaneous with an update of the value $A_1$ to $B_1$. Moreover, in other implementations, the RN handler 114 updates the values $A_2$ thru $A_P$ to $B_2$ thru $B_P$ after an update of the value $A_1$ to $B_1$.

A notification removal handler 126 determines whether one or more of the values A of read status 120, that correspond to the identifiers $ID_1$ thru $ID_P$ of the notification data 112 are updated. For example, the notification removal handler 126 determines whether $A_1$ changed to $B_1$ and $A_2$ changed to $B_2$, and so on until $A_P$ changed to $B_P$. As another example, the notification removal handler 126 determines whether $A_1$ changed to $B_1$ or $A_2$ changed to $B_2$ and so on until $A_P$ changed to $B_P$.

In response to determining that the one or more values, of the read status 120, that correspond to the identifiers $ID_1$ thru $ID_P$ of the notification data 104 are updated, the notification removal handler 126 generates a modify instruction message 232 that is sent via the network 230 to the client system 102.

In some implementations, the modify instruction message 232 includes the values $B_2$ thru $B_P$ and the identities $Id_2$ thru $Id_P$ of client services $105_2$ thru $105_P$, which are unused for reading the notifications $110_2$ thru $110_P$. The identities $Id_2$ thru $Id_P$ within the modify instruction message 232 identify the corresponding client services $105_2$ thru $105_P$ for which the values $A_2$ thru $A_P$ changed to corresponding values $B_2$ thru $B_P$.

In other implementations, the modify instruction message 232 includes one or more of the values $B_2$ thru $B_P$ that corresponds to one of the client services $105_2$ thru $105_P$ that requested the read status 120. For example, when the client service $105_2$ generates a poll requesting the read status 120, the modify instruction message 232 includes the value $B_2$.

Upon receiving the modify instruction message 232, the client system 102 modifies the remaining notifications $110_2$ thru $110_P$ that are unread by a user. For example, the client system 102 unbolds, shades, or deletes the notifications $110_2$ thru $110_P$. To further illustrate, the client system 102 changes an integer '1' that indicates that the notification $110_2$ is received within the client service $105_2$ to '0'. As another example, the client system 102 deletes a text notice that indicates within the client service representation $104_2$ that "You have a message". As another example, the client system 102 changes a display of the notifications $110_2$ thru $110_P$ to indicate that the notifications are read even though the notifications $110_2$ thru $110_P$ are unread by a user. To further illustrate, the client system 102 unbolds a text notice that indicates within the client service representation $104_2$ that "You have a message".

It should be noted that the RN handler 114 and notification removal handler 126 are modules, which are computer programs that are executed by one or more servers of the server system 104.

It should also be noted that in some implementations, functions described herein as performed by the server system 106 are performed by one or more processors of one or more servers of the server system 106. Similarly, in some implementations, functions described herein as performed by the client system 102 are performed by one or more processors of one or more client devices of the client system 102.

Figure 2:
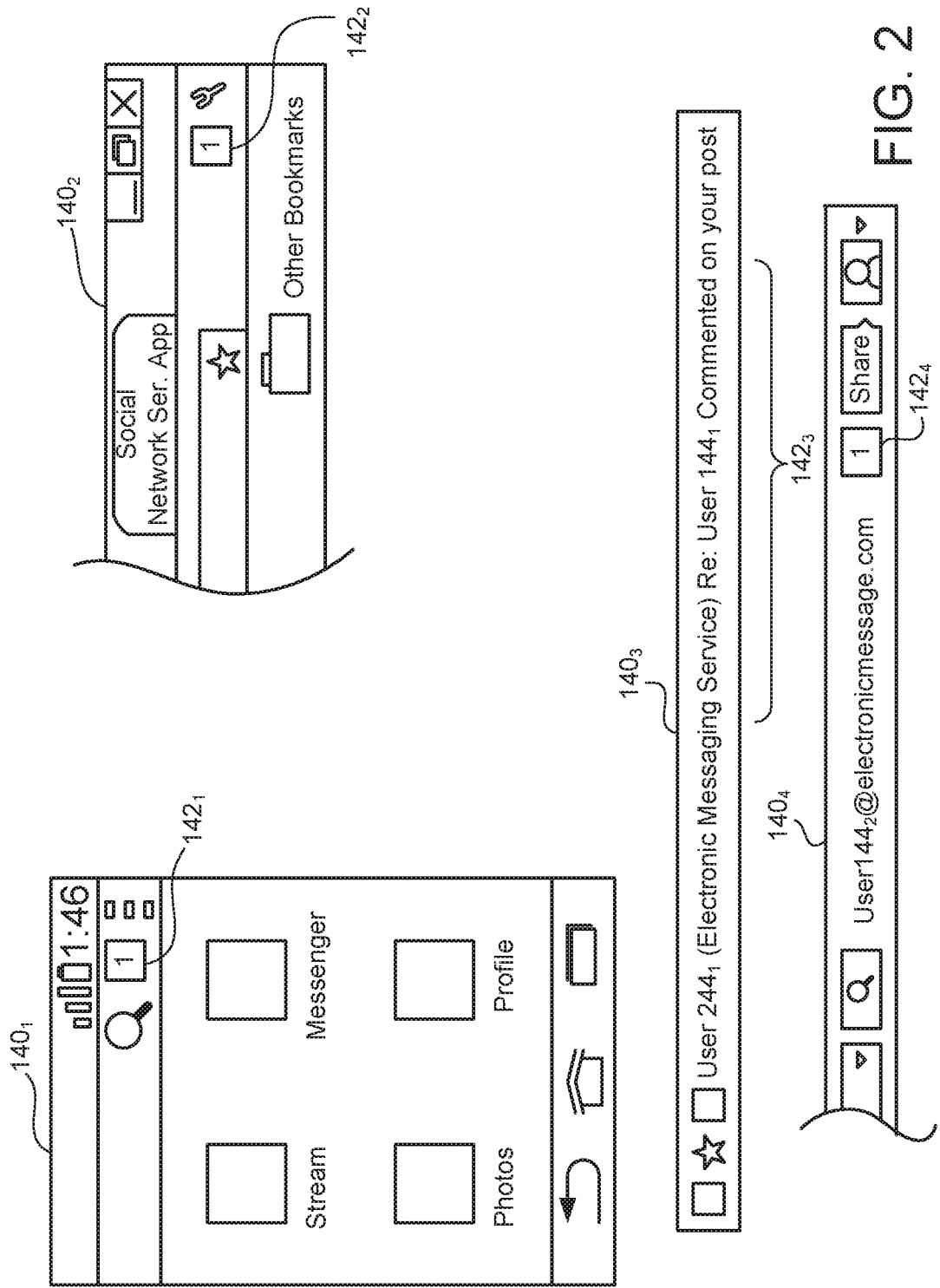
FIG. 2 is a diagram of example notifications that are displayed within different client service representations, in accordance with some implementations of the present disclosure.

FIG. 2 is a diagram of various implementations of notifications that are displayed within different client service representations. A notification $142_1$ is displayed within a social network service representation $140_1$, which is displayed on a display screen. The social network service representation $140_1$ is accessed via an operating system service and provides access to various client services, e.g., a photo storage service, a streaming service, a messenger service, and a profile service. The streaming service allows a website account interface of a user $144_2$ to receive network messages from other website account interfaces of other users and allows the website account interface to send network messages to the other website account interfaces. Moreover, the messenger service allows the user $144_2$ to chat via a website account interface of the user $144_2$ and via a website account interface of another user to chat with the other user. The profile service allows the user $144_2$ to post information regarding the user $144_2$, e.g., for example, a name of the user $144_2$, a marital status of the user $144_2$, an entity where the user $144_2$ is employed, a university or school that the user $144_2$ is attending, a gender of the user $144_2$, an electronic message address of the user $144_2$, and a photo of the user $144_2$. The notification $142_1$ indicates that the user $144_2$ having a website account for receiving a social network service has received one network message from another website account of another user. In some implementations, the social network service representation $140_1$ is displayed on a display screen when the user $144_2$ selects, via an input device, a social network service icon on the display screen.

In various implementations, the notification $142_1$ is a sub-notification that when selected by a user via an input device leads to a display of another sub-notification, e.g., "User has commented on your photo." Upon receiving a selection of the other sub-notification from a user, a network message, e.g., "Nice photo", is displayed.

A notification $142_2$ is displayed within a web browser service representation $140_2$ that is displayed on a display screen of a client device. The notification $142_2$ indicates that a network message is received by a user in a website account interface that is associated with a website account that is further associated with a social network service. When a selection of the notification $142_2$ is received, a network message is displayed on a display screen of a client device.

A notification $142_3$ is displayed within an electronic message inbox of an electronic message service representation $140_3$ when the user $144_2$ receives a network message from another user. For example, the notification $142_3$ includes a text notice that indicates that "User $144_1$ commented on your post". In some implementations, when the notification $142_3$ is selected by the user $144_2$ via an input device of a client device, a network message to the user $144_2$ is displayed within an electronic message on a display screen of the client device.

Moreover, another notification $142_4$ is displayed within a toolbar service representation $140_4$. The notification $142_4$ indicates that the user $144_2$ has received a network message in his/her website account interface that is associated with a social network service. The toolbar service representation $140_4$ includes a picture of the user $144_2$ and an electronic message address of the user $144_2$. In some implementations, when the notification $142_4$ is selected by the user $144_2$ via an input device of a client device, a network message is displayed to the user $144_2$ on a display screen of the client device.

It should be noted that a display screen, as used herein, is a display screen of a client device. Moreover, it should be noted that all the notifications 142 when selected by a user lead to the same network message. Accordingly, it is redundant for the user $144_2$ to select the notifications $142_2$, $142_3$, and $142_4$ after selecting the notification $142_1$.

Figure 3A:
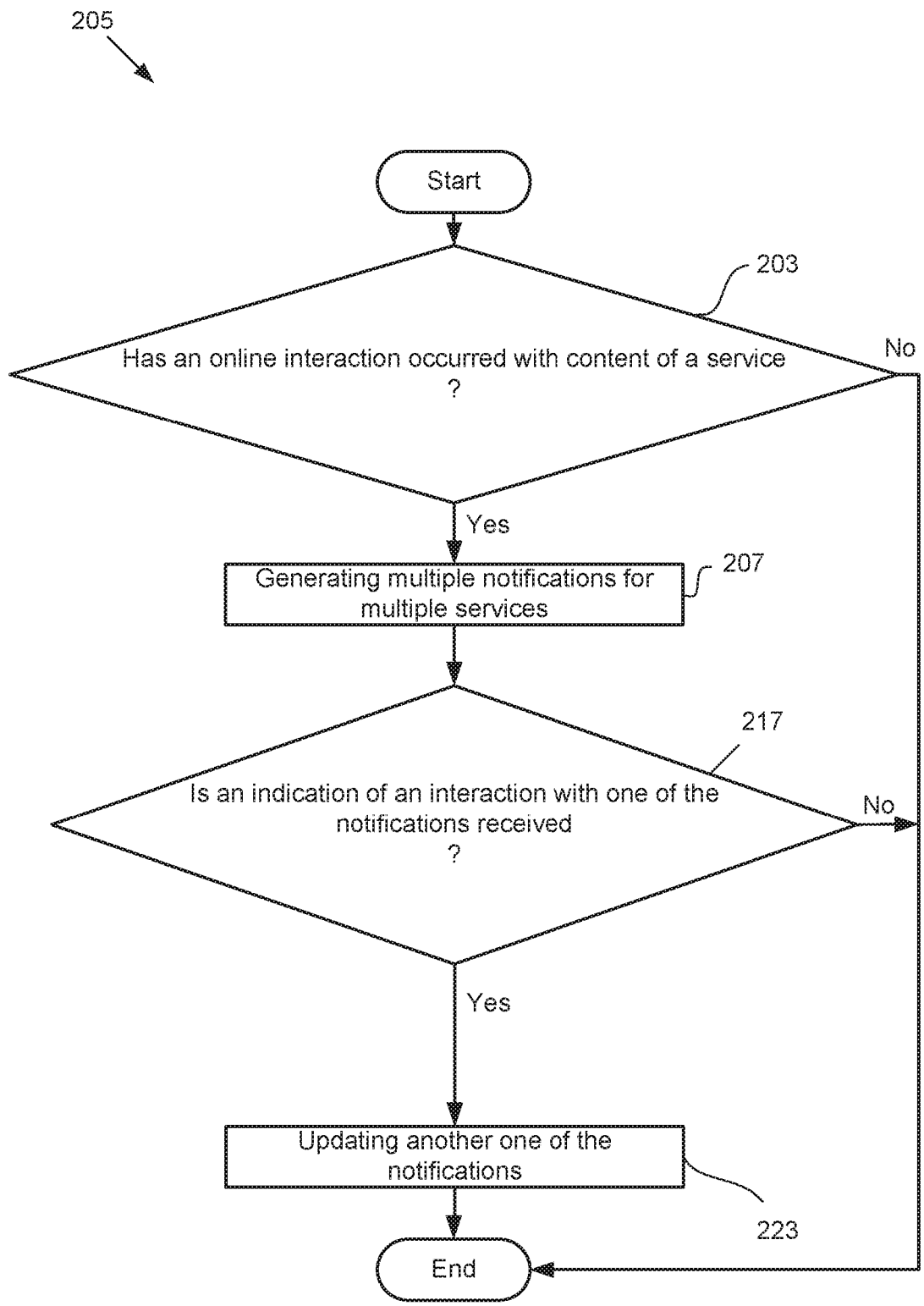
FIG. 3A is a flowchart of an example method for updating a read status when a message indicating that a notification is read is received, in accordance with an various implementations of the disclosure.

FIG. 3A is a flowchart of various implementations of a method 205 for updating the notifications 110 (FIG. 1). The method 205 is executed by one or more processors of one or more servers of the server system 106 (FIG. 1).

In operation 203, it is determined whether an online interaction has occurred with content of one of the client services 105 (FIG. 1). For example, it is determined whether a signal indicating that a user has sent a message to another user via the network 230 is received via the network 230 from the client system 102 (FIG. 1). To illustrate, a user sends a message to another user by sending a post that is created within a social network service. As another example, a user sends an electronic message to another user. As yet another example, a user selects a send button within a social network service or an electronic message service to send a message to another user. The user selects the send button via an input device of a client device to generate the signal that indicates that the user has sent the message. Upon determining that there is a lack of occurrence of the online interaction, the method 205 ends.

On the other hand, upon determining that the online interaction has occurred, in operation, in operation 207, the notification data 112 is generated and sent via the network 230 to the client system 102 (FIG. 1). For example, the notification data $112_1$ is sent via the network 230 to the client service $105_1$ and notification data $112_2$ is sent via the network 230 to the client service $105_2$. The client system 102 renders the notification data 112 to display the notifications 110 within corresponding client service representations 104 (FIG. 1). For example, the notification data $112_1$ is rendered to display the notification $110_1$ within the client service representation $104_1$ and the notification data $112_2$ is rendered to display the notification $110_2$ within the client service representation $104_2$.

It should be noted that in some implementations, the notification data $110_1$ has a different format than that of the notification $110_2$. For example, the notification $110_1$ includes more alphanumeric characters than the notification data $110_2$. As another example, the notification $110_1$ includes an image and the notification $110_2$ includes a video. As another example, the notification $110_1$ includes one type of multimedia and the notification $110_2$ includes another type of multimedia. Types of multimedia include an image, a video, text, and an audio.

Moreover, it should be noted, that in various implementations, content, e.g., features, of the service $105_1$, is different than content of the service $105_2$. For example, some features of the service $105_1$ facilitate chat with social network friends, allow posting of multimedia, and allow keeping touch with social network friends. Moreover, in this example, some features of the service $105_2$ allow sending electronic messages to other users, receiving electronic messages from the other users, and accessing messages with the service $105_2$ for a longer time period than with the service $105_1$. As another example, some features of the service $105_1$ allow a user to upload music to a server, to download music from the server, and to listen to music and some features of the service $105_2$ allow a user to upload videos to a server and to watch the videos. As yet another example, the content of the service $105_1$ is particular to the service $105_1$. To illustrate, at least one feature of the service $105_1$ is not offered by the service $105_2$. As another example, the content of the service $105_1$ is particular to the service $105_1$ and the content of the service $105_2$ is particular to the service $105_2$. To illustrate, at least one feature of the service $105_1$ is not offered by the service $105_2$ and at least one feature of the service $105_2$ is not offered by the service $105_1$.

In a variety of implementations, the service $105_2$ is different from the service $105_2$. For example, the service $105_1$ is a telecommunications service and the service $105_2$ is a social network service. As another example, the service $105_1$ is a social network service and the service $105_2$ is an electronic messaging service or a telecommunications service. In some implementations, the service $105_1$ is the same as the service $105_2$. For example, both services $105_1$ and $105_2$ are a social network service. As another example, both services are an electronic messaging service.

Moreover, in operation 217, it is determined whether an indication of an interaction with the notification $110_1$ is received via the network 230 from the client system 102. For example, it is determined whether an indication that a user has selected the notification $110_1$ is received via the network 230.

Upon determining that the indication of the interaction with the notification $110_1$ is not received, the method 205 ends. On the other hand, upon determining that the indication of the interaction with the notification $110_1$ is received, in operation 223, the notification data $112_2$ thru $112_P$ is updated to indicate the interaction with the notification $110_1$. For example, the notification data $112_2$ thru $112_P$ is updated to decrement values indicated within notifications $110_2$ thru $110_P$. As another example, the notification data $112_2$ thru $112_P$ is updated to delete or change a shade of the notifications $110_2$ thru $110_P$.

Figure 3B:
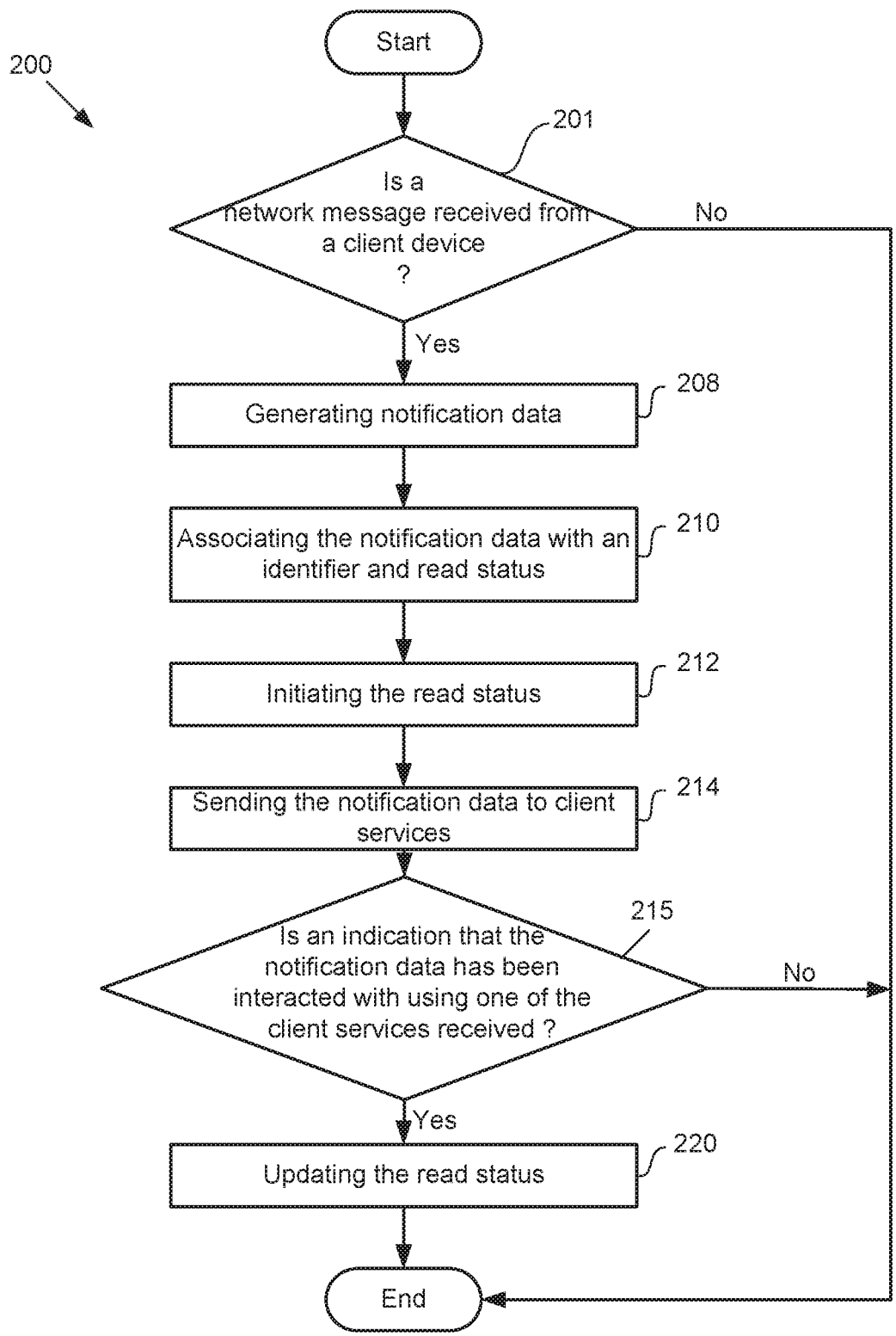
FIG. 3B is a flowchart of an example method for updating a read status when a message indicating that a notification is read is received, in accordance with an various implementations of the disclosure.

FIG. 3B is a flowchart of some implementations of a method 200 for updating a read status when a message indicating that a notification is read is received. The method 200 is performed by one or more processors of one or more servers of the server system 106 (FIG. 1).

In operation 201, a determination is made whether a network message is received from a client device of the client system 102 (FIG. 1). The network message is contextually originated using one of client services 105 that is used to generate the network message. For example, if the client service $105_1$ is used to generate the network message, the network message has a different lifespan during which the message can be accessed by a user at a client device. The lifespan is different than that when the client service $105_2$ is used to generate the network message. As another example, if the client service $105_1$ is used to generate the network message, the network message has a different format. The format is different than that when the client service $105_2$ is used to generate the network message. As yet another example, the network message is generated using features of one of the client services 105 and in various implementations, the features are different than features of the remaining of the client services 105. In some implementations, a lifespan of the network message and a format of the network message are examples of features of one of client services 105. Examples of a network message include a post created within a social network service, a comment to the post also made within the social network service, an electronic message created using an electronic messaging service, etc.

The network message received from the client device is a network message to be sent from one website account to another website account. For example, the network message is received via the network 230 (FIG. 1) and is to be sent from a website account of a social network service to another website account of the social network service. In response to determining that the network message is not received, the method 200 ends. On the other hand, upon determining that the network message is received, in operation 208, notification data 112 (FIG. 1) is generated.

Moreover, in operation 210, the notification data 112 is associated with the identifiers $ID_1$ thru $ID_P$ of the notification data 112 and with the read status 120 (FIG. 1). For example, the identifier $ID_1$ (FIG. 1) is assigned to the notification data $112_1$ and a position of the value $A_1/B_1$ of the read status 120 in the database 116 (FIG. 1) is assigned to the identifier $ID_1$. As another example, identifier $ID_P$ is assigned to the notification data $112_P$ and a position of the value $A_P/B_P$ of the read status 120 in the database 116 is assigned to the identifier $ID_P$.

Furthermore, in operation 212, positions of the values of the read status 112 that are assigned to the identifiers ID are initiated to the values $A_1$ thru $A_P$ indicate that the notification 112 is unread by the user $144_2$ (FIG. 2). The value $A_1$ indicates that the notification $110_1$ is unread by the user $144_2$ via the client service $105_1$ and the value $A_P$ indicates that the notification $110_P$ is unread by the user $144_2$ via the client service $105_P$.

In operation 214, the notification data 112 is sent to the client services 105 (FIG. 1). For example, the notification data $112_1$ is sent via the network 230 to the client service $105_1$ and the notification data $112_P$ is sent via the network 230 to the client service 105P.

In operation 215, it is determined whether an indication that one of the notifications 110, e.g., the notification $110_1$, $110_2$, $110_3$, and so on until $110_{P-1}$, or $110_P$, has been interacted with using one of the client service representations 104. For example, it is determined whether a message indicating that one of the notifications 110, e.g., the notification $110_1$, $110_2$, $110_3$, and so on until $110_{P-1}$, or $110_P$, is read by the user $144_2$. As another example, the user $144_2$ reads the notification $110_1$ by selecting via an input device of a client device the notification $110_1$ displayed within the client service representation $104_1$ that is displayed on a display screen of the client device. When one of the notifications 110 is read, the RN message 218, which is an example of the indication, is received via the network 230 (FIG. 1). For example, when the notification $110_1$ is read via the client service 1051, the RN message 218 includes an identifier of the client service $105_1$ and an identifier of the notification 110. The identifier of the client service $105_1$ indicates to one or more servers of the server system 106 that the notification is read via the client service $105_1$. In response to determining that the indication that one of the notifications 110 has not been interacted with, the method 200 ends.

On the other hand, upon determining that the indication that one of the notifications 110 has not been interacted with is received, in operation 220, the read status 120 of the notification data 112 is updated to represent that the notifications 110 have been interacted with based on the indication. For example, when the read notification handler 114 determines that the RN message 218 is received, the read notification handler 114 changes the value $A_1$ to $B_1$, $A_2$ to $B_2$, and so on until the value $A_P$ is changed to $B_P$. The values $B_1$ thru $B_P$ indicate that the notifications 110 are read. In some implementations, each value $A_1$, $A_2$, and so on until $A_P$ and the values $B_1$, $B_2$ and so on until $B_P$ is an example of a read status indicator.

It should be noted that the value $A_1$ is changed to the value $B_1$, the value $A_2$ is changed to the value $B_2$ and so on until the value $A_P$ is changed to the value $B_P$ when the notifications $110_2$ thru $110_P$ are unread by the user $144_2$ and the notification $110_1$ is read by the user $144_2$. For example, when the notification $110_2$ is not read by the user $144_2$ and the notification $110_1$ is read by the user $144_2$, the value $A_2$ is changed to $B_2$ without issuance of an RN message that indicates to the server system 105 that the notification $110_2$ is read via the client service $105_2$. In this example, the RN message is not issued by a client device of the client system 102. Moreover, in this example, when the notification $110_1$ is read via the client service $105_1$, the value $A_2$ is changed to $B_2$ regardless of whether the notification $110_2$ is read by the user $144_2$. The method 200 ends after operation 220.

In several implementations, instead of determining whether one of the notifications 110 is read by the user $144_2$, it is determined whether a number, e.g., two or three, of the notifications are read by the user $144_2$. In these implementations, the remaining of read status 120 corresponding to the remaining of notification data 112 of the remaining of notifications 110 that are unread by the user $144_2$ are updated by the read notification handler 114 (FIG. 1) to the values of B from A. Moreover in these implementations, the notification removal handler 126 (FIG. 1) send a message to remove the remaining of the notifications 110 that are unread. In other implementations, instead of sending a message to remove the remaining of the notifications 110 that are unread, the notification removal handler 126 sends a message to remove all but one of the notifications 110 that is read by the user $144_2$. In some implementations, instead of sending a message to remove the remaining of the notifications 110 that are unread, the notification removal handler 126 sends a message to remove notifications 110 except for the one that is read first by the user $144_2$. For example, if the notifications $110_1$ and $110_2$ are read by the user $144_2$, the remaining notifications $110_3$ thru $110_P$ are unread, and the notification 1101 is read first between the notifications $110_1$ and $110_2$, a message to remove the notifications $110_2$ thru $110_P$ is sent.

Figure 4:
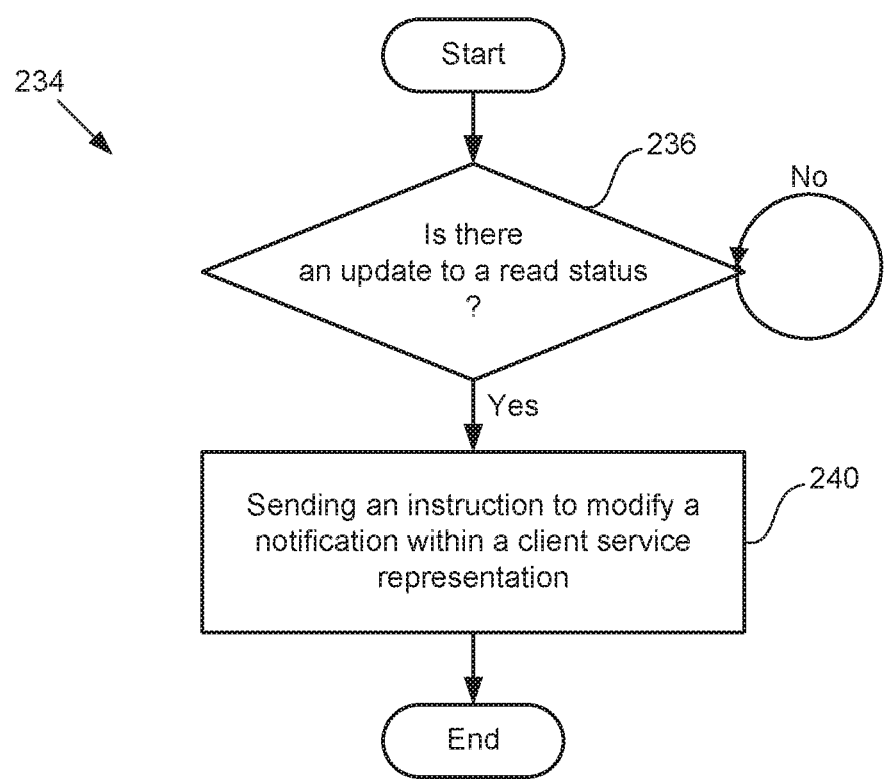
FIG. 4 is a flowchart of an example method for communicating an instruction to modify the remaining of the notifications that are unread by a user, in accordance with some implementations of the disclosure.

FIG. 4 is a flowchart of several implementation of a method 234 for communicating an instruction to modify the remaining of the notifications 110 that are unread by the user $144_2$. The method 234 is executed by one or more processors of one or more servers of the server system 116 (FIG. 1). In operation 236, the notification removal handler 126 (FIG. 1) determines whether an update to the read status 120 is made within the database 116 (FIG. 1). For example, it is determined whether the value $A_1$ is updated to $B_1$ and so on until the read status $A_P$ is updated to $B_P$. Upon determining that the update to the read status 120 is not made, the notification removal handler 126 keeps checking whether the update is made.

Upon determining that the update to the read status 120 is made, in operation 240, the modify instruction message 232 is sent via the network 230 to the client services $105_2$ thru $105_P$. The modify instruction message 232 includes information to modify the notifications $110_2$ thru $110_P$. As an example, the modify instruction message 232 includes the identifiers $ID_2$ thru $ID_P$, the identities $Id_2$ thru $Id_p$, and the values $B_2$ thru $B_P$. As another example, the modify instruction message 232 includes the identifiers $ID_2$ thru $ID_P$ and the value $B_2$ thru $B_P$. As yet another example, the modify instruction message 232 indicates to the client services $105_2$ thru $105_P$ that the value $A_1$ is changed to the value $B_1$ and so on until the value $A_P$ is changed to the value $B_P$. The method 234 ends after operation 240.

In various implementations, the method 234 follows the method 200 (FIG. 2). For example, instead of ending the method 200 after operation 220 (FIG. 2), the operation 236 is performed after the operation 220.

Figure 5:
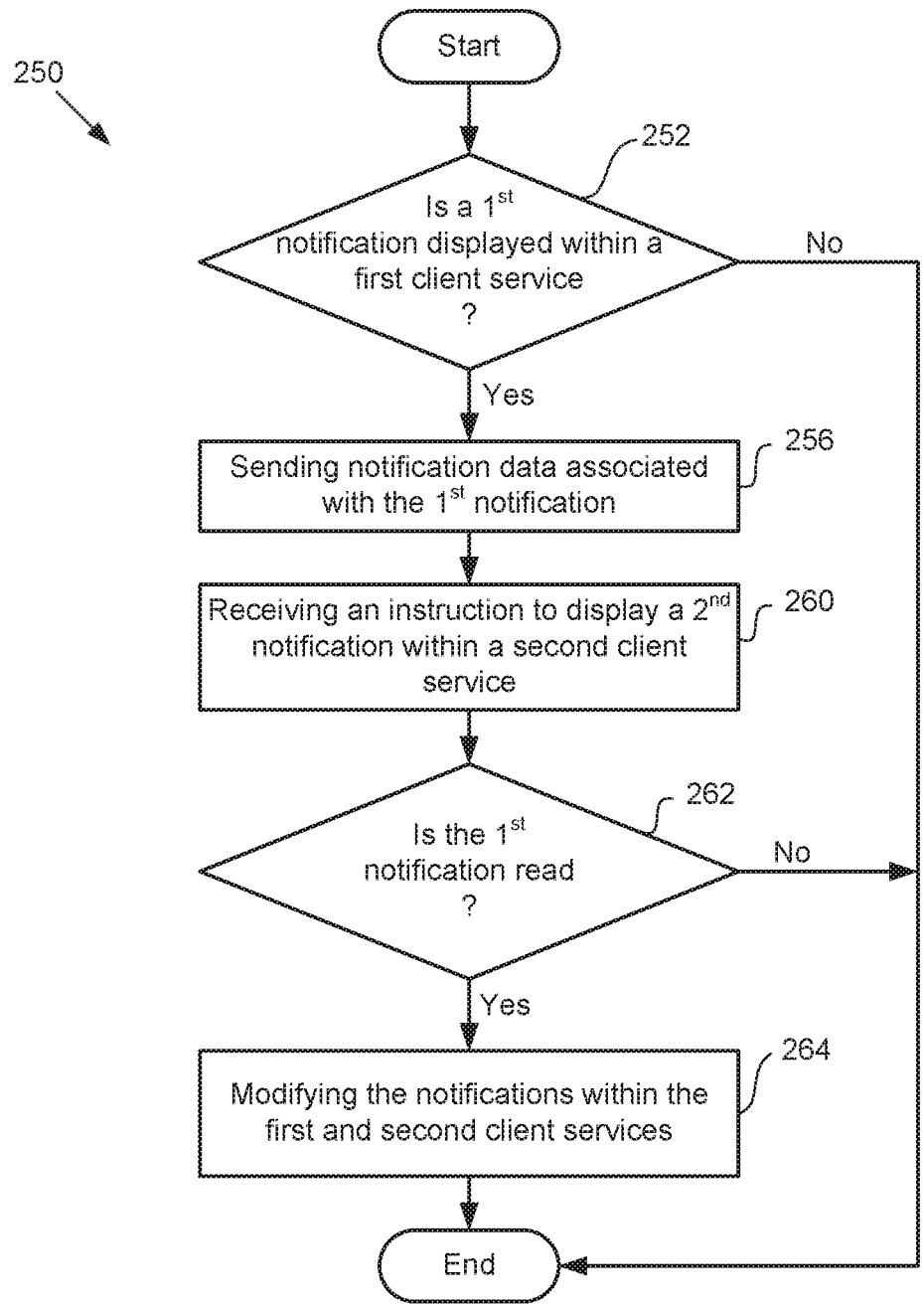
FIG. 5 is a flowchart of an example method for modifying one or more of the notifications, in accordance with various implementations of the disclosure.

FIG. 5 is a flowchart of some implementations of a method 250 for modifying the notifications $110_2$ thru $110_P$. The method 250 is executed by one or more processors of one or more client devices of the client system 102.

In operation 252, it is determined whether the notification $110_1$ is displayed within the client service representation $104_1$ (FIG. 1) that is displayed within a website account interface of the user $144_2$. The notification $110_1$ is displayed when a network message is sent from one website account interface of the user $144_1$ to another website account interface of the user $144_2$. Upon determining that the notification $110_1$ is not displayed, the method 250 ends.

On the other hand, upon determining that the notification $110_1$ is displayed, in operation 256, notification data 112 is sent from the client system 102 to the server system 106 via the network 230 (FIG. 1). The notification data 112 is associated with the notification $110_1$. For example, the notification data 112 is processed by a client device of the client system 102 to display the notification $110_1$ on a display screen of the client device.

In operation 260, an instruction to display the notification $110_2$ within the client service representation $104_2$ of the website account interface of the user $144_2$ is received. Upon receiving the instruction, the notification $110_2$ is displayed within the client service representation $104_2$.

In operation 262, it is determined whether the notification $110_1$ that is displayed within the client service representation $104_1$ is read by a user via an input device. For example, it is determined whether the notification $110_1$ is selected by a user via an input device. The notifications 110 notify the user $144_2$ that the network message 204 is received by a client device that the user operates.

Upon determining that the notification $110_1$ is unread, the method 250 ends. On the other hand, upon determining that the notification $110_1$ is read, the notifications $110_1$ and $110_2$ are modified. For example, the notification $110_1$ is unbolded or shaded but still displayed within the client service representation $104_1$ that is displayed on a display screen of a client device and the notification $110_2$ is deleted from the display screen. As another example, the notifications $110_1$ and $110_2$ are unbolded or shaded but both the notifications $110_1$ and $110_2$ are displayed on a display screen of a client device. The method 250 ends after the operation 264.

Figure 6A:
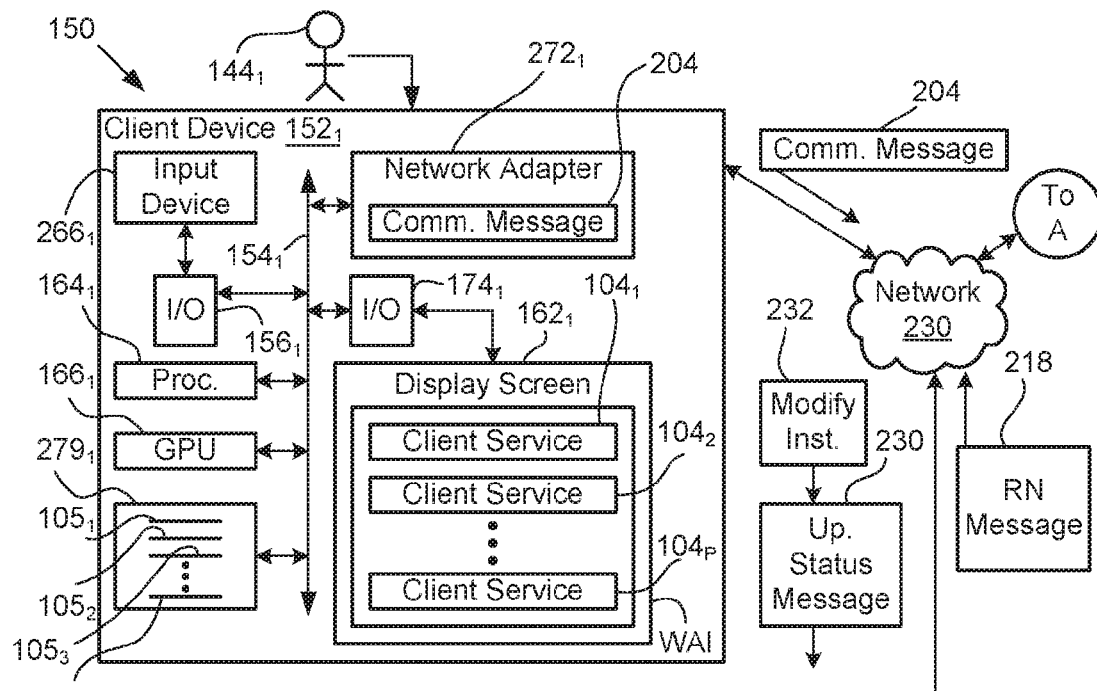
FIG. 6A is a portion of a detailed block diagram of an example architecture that illustrates management of notifications, in accordance with some implementations of the disclosure.
Figure 6A:
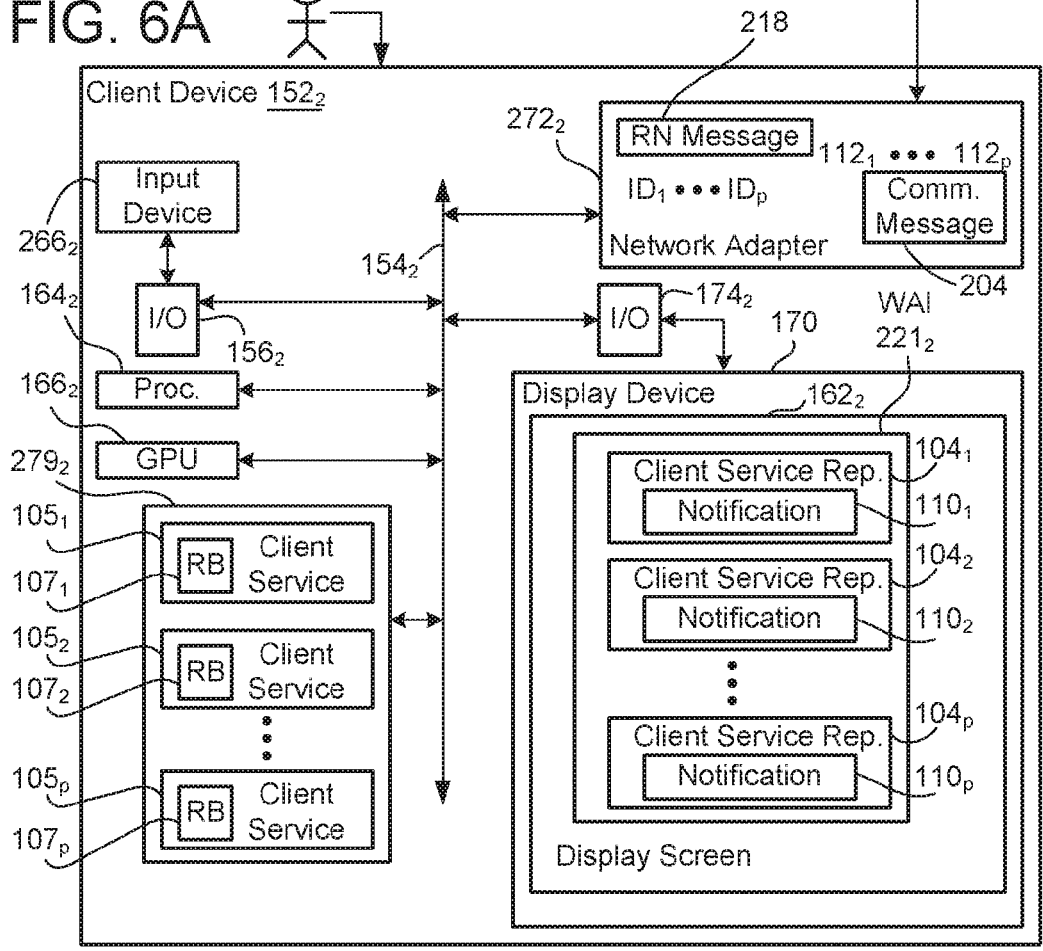
Figure 6B:
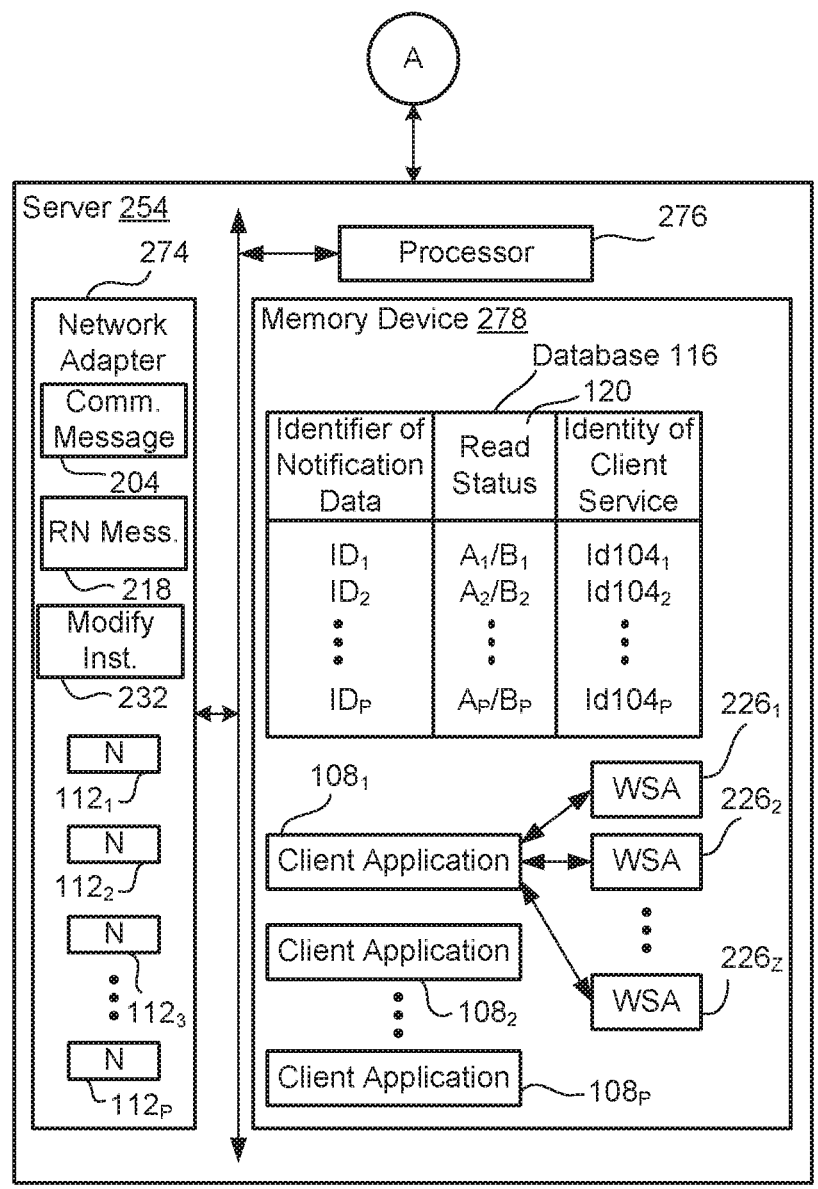
FIG. 6B is the remaining portion of the detailed block diagram of the architecture of FIG. 6A, in accordance with some implementations of the present disclosure.

FIG. 6, which includes FIGS. 6A and 6B, is a block diagram of various implementations of an architecture 150 that illustrates management of notifications 110. The user $144_1$ operates a client device $152_1$ to generate a network message 204. For example, the user $144_1$ provides his/her login information to log into a website account (WSA) $226_1$ that is assigned by a server 254 to the user $144_1$. The website account $226_1$ is accessed via a web browser. When the login information of the user $144_1$ is authenticated by a server 254, a GPU $166_1$ processes data of the client services 105 and data of a website account interface $221_1$ to render the client service representations 104 within the website account interface $221_1$. In some implementations, the website account interface $221_1$ includes login information regarding the user $144_1$. In some implementations, the website account interface $221_1$ includes an image of the user $144_1$.

Moreover, after the authentication, the user $144_1$ accesses the client service $105_1$ via the client service representation $104_1$ that is displayed on a display screen $162_1$ and enters the network message 204 via an input device $266_1$. The input device $266_1$ is coupled with a bus $154_1$ via an I/O interface $156_1$. It should be noted that the network message 204 is displayed by the GPU $166_1$ on the display screen $162_1$ when a processor $164_1$ receives the network message 204 from the user $144_2$. The display screen $162_1$ is coupled with an I/O interface $174_1$. The GPU $166_1$, the processor $164_1$, the I/O $156_1$, the network adapter $272_1$, a memory device $279_1$, and the I/O $174_1$ are coupled with each other via the bus $154_1$.

The user $144_1$ addresses the network message 204 to the user $144_2$. For example, the user $144_1$ selects an icon that represents the user $144_2$ within the client service representation $104_1$. When the icon is selected, the client service $105_1$ is executed by the server 254 to display a comment field within the client service representation $104_1$. The user $144_1$ enters a comment in the comment field. When the user $144_1$ enters the comment, the comment is an example of the network message 204 that is directed to the user $144_2$.

When the network message 204 is addressed to the user $144_2$, a network adapter $272_1$ sends the network message 204 via the network 230 to the server 254. Examples of a network adapter include a network interface card (NIC) and a modem. A network adapter 274 of the server 254 receives the network message 204. A processor 276 of the server 254 processes the network message 204 to determine that the network message 204 is generated from the website account $226_1$ and is addressed to a website account $226_2$ of the user $144_2$.

Moreover, upon receiving the network message 204, notification data 112 is generated for the client services 105 by the processor 276. Furthermore, upon receiving the network message 204, the database 116 is created by the processor 276 within a memory device 278. For example, the processor 276 assigns the identifiers $ID_1$ thru $ID_P$ to the notification data 112 and assigns positions of the values A/B of the read status 120 in the database 116 (FIG. 1) to the identifiers $ID_1$ thru $ID_P$. As another example, the identifier $ID_1$ is assigned to the notification data $112_1$ and so on until the identifier $ID_P$ is assigned to the notification data $112_P$. Moreover, a position of the value $A_1/B_1$ is assigned to the identifier $ID_1$ and so on until a position of the value $A_P/B_P$ is assigned to the identifier $ID_P$.

The network adapter 274 sends the network message 204, the notification data 112, the identities id of client service 105 that are processed to render the client service representations 104 in which the notification data 110 is displayed, and the identifiers ID of the notification data 110 to the client device $152_2$ that is operated by the user $144_2$ to access his/her website account $226_2$. For example, the notification data $112_1$ is sent to the client service $105_1$ via the network 230, the notification data $112_2$ is sent to the client service $105_2$ via the network 230, and so on until the notification data $112_P$ is sent to the client service $105_P$ via the network 230.

In some implementations, the user $144_2$ enters his/her login information that is authenticated by the server 254 to allow the user $144_2$ to access the website account $226_2$. When the login information of the user $144_2$ is authenticated, the user $144_2$ is allowed access by the server 254 to the client services 105. Moreover, when the login information of the user $144_2$ is authenticated, a GPU $166_2$ processes data of the client services 105 and data of a website account interface $221_2$ to render the client service representations 105 within the website account interface $221_2$. In various implementations, the website account interface $221_2$ includes login information regarding the user $144_2$. In some implementations, the website account interface $221_2$ includes an image of the user $144_2$.

Furthermore, when the network message 204, the notification data 112, the identities Id, and the identifiers ID are received by a network adapter $277_2$ of the client device $152_2$, the GPU $166_2$ processes the notification data 112 to display the notifications 110 on a display screen $162_2$ of a display device 170 of the client device $152_2$. For example, the notification $110_1$ is displayed within the client service representation $104_1$ and so on until the notification $110_P$ is displayed within the client service representation 104P.

Moreover, read bits 107 within a memory device $279_2$ of the client device $152_2$ are generated by a processor $164_2$. Each of the read bits 107 identifies a read status of a corresponding notification. For example, the read bit $107_1$ identifies whether the notification $110_1$ is read by the user $144_2$. As another example, the read bit $107_P$ identifies whether the notification $110_P$ is read by the user $144_P$. If a value of the read bit $107_P$ is $A_P$, the processor $164_2$ determines that the notification $110_P$ is unread by the user $144_2$. On the other hand, if a value of the read bit $107_P$ is $B_P$, the processor $164_2$ determines that the notification $110_P$ is read by the user $144_2$. When the read bits 107 are generated, all the read bits 107 are initiated by the processor $164_2$ to the values A.

The display device 170 is coupled with an I/O interface $174_2$. The GPU $166_2$, the processor $164_2$, an I/O $156_2$, the memory device $279_2$, the network adapter $272_2$, and the I/O $174_2$ are coupled with each other via a bus $154_2$.

The user $144_2$ views the notification $110_1$ and selects the notification $110_1$ via the input device $266_2$. When the notification $110_1$ is selected, processor $164_2$ determines that the notification $110_1$ is read by the user $144_2$. Upon determining that the notification $110_1$ is read, the network adapter $272_2$ generates the read notification message 218 that includes the identifier $ID_1$ that identifies the notification $110_1$ that is read.

The read notification message 218 is sent via the network 230 to the server 254. The network adapter 274 receives the read notification message 218 and disintegrates the read notification message 218 to provide the identifier $ID_1$ to the processor 276. Upon receiving the identifier $ID_1$, the processor 276 determines that the notification $110_1$ that corresponds to the notification data $112_1$ was read.

Upon determining that the notification $110_1$ was read, the processor 276 changes the value $A_1$ to $B_1$ and changes the remaining values $A_2$ to $A_P$ to $B_2$ thru $B_P$. For example, the processor 276 changes the value $A_2$ to $B_2$ and so on until the value $A_P$ is changed to the value $B_P$. Upon determining that the values $A_1$ thru $A_P$ are changed to $B_1$ thru $B_P$, the network adapter 274 generates the modify instruction message 232 that includes the identifiers ID, the identities Id, and the values $B_1$ thru $B_P$. As described above, the modify instruction message 232 includes commands to modify the notifications 110.

Upon receiving the modify instruction message 232, the network adapter 2722 disintegrates the modify instruction message 232 to provide the identifiers ID, the identities Id, and the values $B_1$ thru $B_P$ to the processor $164_2$. Upon receiving the identifiers ID, the identities Id, and the values $B_1$ thru $B_P$, the processor 164 modifies read bits 107 to the values $B_2$ thru $B_P$ for the client services $105_2$ thru $105_P$ that are identified by the identities $Id_2$ thru $Id_P$. For example, the processor $164_2$ modifies the read bits $107_2$ thru $107_P$ from the value A to the value B. The GPU $166_2$ modifies one or more of the notifications 110 that are displayed within one or more of the client service representations 104 based on the read bits 107. For example, when the GPU $166_2$ determines that the read bits $107_2$ thru $107_P$ have the values $B_2$ thru $B_P$, the GPU $166_2$ deletes the notifications $110_2$ thru $110_P$. As another example, when the GPU $166_2$ determines that the read bits $107_2$ thru $107_P$ have the values $B_2$ thru $B_P$, the GPU $166_2$ unbolds or shades the notifications $110_2$ thru $110_P$.

In other implementations, the database 116 is generated to include the identifier ID and the read status 120 and exclude the identities Id. In these implementations, instead of receiving the modify instruction message 232 that includes the identifiers ID, the identities Id, and the notification data 112, any of the client services $105_2$ thru $105_P$ sends a poll via the network adapter $272_2$ and the network 230 to the server 254 to determine whether a corresponding one of the values $A_2$ thru $A_P$ has changed to a corresponding value $B_2$ thru $B_P$ within the database 116. For example, the client service $105_2$ sends a poll to the server 254 to determine whether the value $A_2$ has changed to $B_2$ within the database 116.

In these implementations, upon receiving the poll, the network adapter 274 determines whether a corresponding one of the values $A_2$ thru $A_P$ have changed to a corresponding value $B_2$ thru $B_P$. For example, the network adapter 274 determines whether the value $A_2$ has changed to $B_2$. Upon determining that the corresponding one of the values $A_2$ thru $A_P$ has changed to a corresponding value $B_2$ thru $B_P$, the network adapter 274 sends an answer to the poll and the answer includes the one of the values $B_2$ thru $B_P$. For example, the network adapter sends the answer with the value $B_2$.

Further, in these implementations, the network adapter $272_2$ disintegrates the answer and provides one of the values $B_2$ thru $B_P$ within the answer to the one of the client services $105_2$ thru $105_P$ that sent the poll. For example, the network adapter $272_2$ disintegrates the answer and provides the value $B_2$ within the answer to the client service $105_2$. It should be noted that the client services $105_2$ thru $105_P$ are executed by the processor $266_2$.

Moreover, in these implementations, upon receiving one of the values $B_2$ thru $B_P$ from the network adapter $272_2$, the one the client services $105_2$ thru $105_P$ that sent the poll is executed by the processor $266_2$ to send commands to the GPU $166_2$ to modify one of the notifications $110_2$ thru $110_P$ that is displayed within a corresponding one of the client service representations $104_2$ thru $104_P$. For example, upon receiving the value $B_2$ from the network adapter $272_2$, the client service $105_2$ that sent the poll is executed by the processor $266_2$ to send a command to the GPU $166_2$ to delete, unbold, or shade the notification $110_2$ that is displayed within the client service representation $104_2$.

In some implementations, the read notification handler 114 and the notification removal handler 126 of FIG. 1 are executed by the processor 276. In other implementations, the read notification handler 114 is executed by the processor 276 and the notification removal handler 126 is executed by the network adapter 274.

It should be noted that in some implementations, the functions described herein as performed by a processor, a network adapter, and a GPU that include separate processors within a client device are performed by one or more processors within the client device.

It should further be noted that in some implementations, the functions described herein as performed by the server 254 are performed by multiple servers. For example, authentication is performed by another server instead of the server 254.

Implementations of the present disclosure can be fabricated as computer-readable code on a non-transitory computer-readable storage medium, which is a memory device. The non-transitory computer-readable storage medium holds data which can be read by a computer system. Examples of the non-transitory computer-readable storage medium include network attached storage (NAS), ROM, RAM, a combination of RAM and ROM, compact discs (CD)s, Blu-ray™ discs, flash memory, hard disks, magnetic tapes, and other data storage devices. The non-transitory computer-readable storage medium may be distributed over a network-coupled computer system so that the computer-readable code is executed in a distributed fashion.

Although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in a desired way.

In addition, at least one operation of some methods performs physical manipulation of physical quantities, and some of the operations described herein are useful machine operations. Implementations presented herein recite a device or apparatus. The apparatus is specially constructed for a specific purpose. The apparatus includes a processor capable of executing the program instructions of the computer programs presented herein.

Although the foregoing implementations have been described with a certain level of detail for purposes of clarity, it is noted that certain changes and modifications can be practiced within the scope of the appended claims.

Accordingly, the provided implementations are to be considered illustrative and not restrictive, not limited by the details presented herein, and may be modified within the scope and equivalents of the appended claims.

What is claimed is:

1. A method comprising:
receiving an indication of a network message about activity that is of interest to a user;
generating first notification data and second notification data based on the indication of the network message;
sending the first notification data to a first client service and the second notification data to a second client service, wherein the first client service and the second client service are hosted by one or more client devices of the user, and wherein the first notification data and the second notification data notify the user of the activity from the network message;
receiving a read notification message indicating that the first notification data to the first client service has been interacted with by the user;
updating, by a processing device, a first read status associated with the first notification data and a second read status associated with the second notification data in response to receiving the read notification message indicating that the first notification data to the first client service has been interacted with by the user;
receiving, from the second client service, a request for the read status associated with the second notification data that has not been interacted with by the user; and
responsive to receiving the request from the second client service, sending a response to the second client service indicating that the read status associated with the second notification data has been modified.

2. The method of claim 1, wherein the network message is generated using an online account interface associated with a first online account, wherein the network message is designated for a second online account, and wherein the first and second online accounts are associated with the first client service.

3. The method of claim 1, wherein the read notification message comprises a first identifier to identify that the first notification data that has been interacted with by the user.

4. The method of claim 1, wherein updating the first read status associated with the first notification data and the second read status associated with the second notification data in response to receiving the read notification message are updated such that the first read status and the second read status have a read status indicator reflecting that the first notification data has been interacted with by the user.

5. The method of claim 1, wherein updating the first read status and the second read status comprises marking the first and the second read status as read without sending a message that indicates that the second notification data is read via the second client service responsive to the updating.

6. The method of claim 1, further comprising:
associating the first notification data with a first identifier and the first read status, the first read status indicating whether the first notification data sent to the first client service is read via the first client service, wherein associating the first notification data with the first identifier and the first read status comprises:
assigning a first identification number to the first notification data; and
assigning the first read status to the first notification data; and
associating the second notification data with a second identifier, the second read status indicating whether the second notification data is read via the second client service, wherein associating the second notification data with the second identifier comprises:
assigning a second identification number to the second notification data.

7. The method of claim 1, further comprising:
initiating the first read status to indicate that the first notification data is unread via the first client service, wherein initiating the first read status to indicate that the first notification data is unread via the first client service comprises assigning a value to the first read status to indicate that the first notification data is unread via the first client service; and
initiating the second read status to indicate that the second notification data is unread via the second client service, wherein initiating the second read status to indicate that the second notification data is unread via the second client service comprises assigning the value to the second read status to indicate that the second notification data is unread via the second client service.

8. The method of claim 1, wherein receiving the read notification message indicating that the first notification data to the first client service has been interacted with by the user comprises receiving the read notification message via a network from a first client device of the one or more client devices.

9. The method of claim 1, wherein the first client service and the second client service comprises one of a social network service, an electronic messaging service, or a telecommunications service, wherein the second client service comprises the social network service, the electronic messaging service, or the telecommunications service.

10. The method of claim 1, wherein the first client service is different from the second client service.

11. A method comprising:
receiving, from a server and by a first client device of one or more client devices of a user, a first notification data to display a first notification via a first client service hosted by the first client device, wherein the first notification data relates to a network message about activity that is of interest to the user;
in response to receiving the first notification data, displaying the first notification via the first client service on the first client device;
sending, by the first client device, a request to the server to determine whether a read status associated with the first notification is modified, wherein the first notification notifies the user of the network message and has not been interacted with by the user; and
responsive to receiving a response to the request indicating that the server modified the read status associated with the first notification, modifying the first notification to indicate that content of the first notification has been read.

12. The method of claim 11, wherein the network message is generated using an online account interface, wherein the online account interface is associated with a first online account, wherein the network message is designated for a second online account, and wherein the first and second online accounts are associated with the first client service.

13. The method of claim 11, wherein modifying the first notification comprises modifying the first notification via the first client service without receiving an input indicating that the first notification is read via the first client service.

14. The method of claim 11, wherein modifying the first notification comprises deleting the first notification.

15. The method of claim 11, wherein the first notification is associated with the first client service hosted by the first client device of one or more client devices of the user, and wherein a second notification is associated with a second client service hosted on a second client device of the one or more client devices of the user, wherein the second notification notifies the user of the network message.

16. The method of claim 15, wherein the first client device and the second client device are different client devices.

17. The method of claim 15, wherein the first client service hosted on the first client device is different from the second client service hosted on the second client device.

18. A system comprising:
a memory device; and
a processing device, coupled to the memory device, to:
receive an indication of a network message about activity that is of interest to a user;
generate first notification data and second notification data based on the indication of the network message;
send the first notification data to a first client service and the second notification data to a second client service, wherein the first client service and the second client service are hosted by one or more client devices of the user, and wherein the first notification data and the second notification data notify the user of the activity from the network message;
receive a read notification message indicating that the first notification data to the first client service has been interacted with by the user;
update a first read status associated with the first notification data and a second read status associated with the second notification data in response to receiving the read notification message indicating that the first notification data to the first client service has been interacted with by the user;
receive, from the second client service, a request for the read status associated with the second notification data that has not been interacted with by the user; and
responsive to receiving the request from the second client service, send a response to the second client service indicating that the read status associated with the second notification data has been modified.

19. The system of claim 18, wherein the first client service is different from the second client service.

20. The system of claim 18, wherein the network message is generated using an online account interface associated with a first online account, wherein the network message is designated for a second online account, and wherein the first and second online accounts are associated with the first client service.

21. A non-transitory computer-readable medium comprising instructions that, responsive to execution by a processing device, cause the processing device to perform operations, wherein the non-transitory computer-readable medium is not a signal, the operations comprising:
receiving, from a server and by the processing device of a first client device of one or more client devices of a user, a first notification data to display a first notification via a first client service hosted by the first client device, wherein the first notification data relates to a network message about activity that is of interest to the user;
in response to receiving the first notification data, displaying the first notification via the first client service on the first client device;
sending, by the first client device, a request to the server to determine whether a read status associated with the first notification is modified, wherein the first notification notifies the user of the network message and has not been interacted with by the user; and
responsive to receiving a response to the request indicating that the server modified the read status associated with the first notification, modifying the first notification to indicate that content of the first notification has been read.

22. The non-transitory computer-readable medium of claim 21, wherein the network message is generated using an online account interface, wherein the online account interface is associated with a first online account, wherein the network message is designated for a second online account, and wherein the first and second online accounts are associated with the first client service.

* * * * *